United States Patent
Newstead

(10) Patent No.: US 8,295,652 B1
(45) Date of Patent: Oct. 23, 2012

(54) COMBINED PORTABLE COMPUTER WITH ADJUSTABLE DISPLAY SCREEN AND ASSOCIATED METHOD

(76) Inventor: Devin Newstead, San Diego, CA (US)

( * ) Notice: Subject to any disclaimer, the term of this patent is extended or adjusted under 35 U.S.C. 154(b) by 1019 days.

(21) Appl. No.: 12/287,351

(22) Filed: Oct. 8, 2008

(51) Int. Cl.
*G06K 9/03* (2006.01)
(52) U.S. Cl. .................... 382/311; 187/271; 187/679.05
(58) Field of Classification Search ............. 361/679.05, 361/679.27, 679.06, 679.21, 679.26–679.29; D14/315; 382/295, 311; 187/271
See application file for complete search history.

(56) References Cited

U.S. PATENT DOCUMENTS

| | | | |
|---|---|---|---|
| 2,785,807 A * | 3/1957 | Prowinsky | 414/589 |
| 3,948,378 A * | 4/1976 | Patton | 194/215 |
| 3,986,591 A * | 10/1976 | Patton | 194/215 |
| 5,007,673 A * | 4/1991 | Cheng | 297/159.1 |
| D337,104 S | 7/1993 | Orchard | |
| 5,339,750 A * | 8/1994 | Smies | 108/147 |
| 5,944,736 A * | 8/1999 | Taylor et al. | 606/198 |
| 6,392,871 B1 | 5/2002 | Yanase | |
| 6,842,338 B2 | 1/2005 | Iredale | |
| 6,972,947 B2 | 12/2005 | Duncan | |
| 7,093,691 B1 * | 8/2006 | Vaughan et al. | 187/269 |
| 7,301,761 B2 * | 11/2007 | Merz et al. | 361/679.27 |
| 7,646,593 B2 * | 1/2010 | Smejkalova | 361/679.27 |
| 2004/0228077 A1 * | 11/2004 | Hall et al. | 361/681 |

* cited by examiner

*Primary Examiner* — Matthew Bella
*Assistant Examiner* — Dennis Rosario

(57) ABSTRACT

An ergonomic laptop for permitting a user to adjust a viewing angle or height as needed may include a base member preferably having a keyboard displayed on a top surface thereof. A mechanism for linearly biasing the display screen along a y-axis defined above the base member, for adjusting a spatial distance between the display screen and the base member, may also be included. Further, the laptop preferably has a mechanism for pivoting the display screen about a fulcrum axis oriented along an x-axis defined subjacent to the y-axis. The base member preferably remains statically positioned at a fixed location while the display screen is linearly displaced along the y-axis. Additionally, a plurality of telescopic shafts and sleeves may be included along with a worm gear centrally disposed between the sleeves to linearly bias the display screen in a vertical direction.

12 Claims, 8 Drawing Sheets

COMBINED PORTABLE COMPUTER WITH ADJUSTABLE DISPLAY SCREEN AND ASSOCIATED METHOD

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to computers and, more particularly, to an ergonomic laptop for permitting a user to adjust a viewing angle or height as needed.

2. Prior Art

Conventional clamshell type laptop computers have an upper display unit rotatably connected to a main module that holds a processor unit, a keyboard, a pointing device, data storage devices, and other peripherals. A hinge positioned at a bottom margin of the display unit connects the display unit to the main module near a rear margin of the main module. Rotation of the display unit about the hinge determines the viewing angle of the display. In normal operation, the display unit is typically rotated to an obtuse angle relative to the keyboard. At a comfortable viewing angle, in which the display faces slightly upward, the display unit extends rearward, away from the main module and the hinge. Adjustment of the display unit to the comfortable viewing angle in shallow workspaces, such as passenger seats of commercial airlines, requires the keyboard to be positioned uncomfortably close to the user. Furthermore, when an airline passenger seat immediately in front of the user is reclined, it can be very difficult for the user to view the display. Use in constrained spaces is especially problematic for laptop computer displays utilizing active matrix LCD technology, which is optically directional and has a limited useful viewing angle.

U.S. Pat. No. 6,392,871 to Yanase discloses a portable computer system which makes it possible to increase the area for an auxiliary device such as a visual indicator and a speaker and to adjust the location and attitude of the auxiliary device with respect to a computer body. This computer system is comprised of a computer body having a first pivot axis, and a display subsystem pivotally connected to the body around the first pivot axis. The display subsystem includes first and second units, one of which is provided with an auxiliary device and the other of which is provided with a display device. The second unit is pivotally connected to the body around the first pivot axis and capable of being held at a desired first pivot angle with respect to the body. The first unit is pivotally connected to the second unit around a second pivot axis and capable of being held at a desired second pivot angle with respect to the second unit. The first pivot axis is located at or near a rear end of the computer body or at a position shifted forward therefrom, and extends along the same rear end. The second axis may be parallel or perpendicular to the first pivot axis. Unfortunately, this prior art reference does not employ telescopic shafts, and instead operates via a double hinge, thereby requiring the user to remain in very close proximity to the system.

U.S. Pat. No. 6,842,338 to Iredale discloses a laptop computer display module for use in a clamshell type laptop computer includes a telescoping rail assembly that enables the display module to be extended upwardly from a keyboard module of the laptop computer when the display module is rotated to an open position. A computer display panel is rotatably mounted to a display support member of the display module adjacent a top margin of the display panel so that the display panel can be manually swung away from the display support member and toward a user of the laptop computer. The invention enables the display panel to be positioned at a comfortable viewing angle without blocking access to the keyboard module for typing and is particularly useful in depth-constrained workspaces such as airplane passenger seats, where the display support member must be positioned at an acute angle relative to the keyboard module. Unfortunately, this prior art example focuses primarily on optimizing the viewing angle and has limited telescopic range. It requires the user to sit in very close proximity to the display.

U.S. Pat. No. 6,972,947 to Duncan discloses a laptop computer including a display securely attached by one or more swing arms, pivotally mounted at their opposite ends to the laptop body and the display, which allows the display to be manually elevated and rotated forward to a position over the keyboard of the computer. The swing arms are sufficient in length to allow the display to be positioned along the rear edge of the computer for normal viewing or rotated and elevated forward or upward for close-up viewing in tight viewing situations. The invention is ideal for near sighted individuals and for use in tight, restricted locations, such as an airplane seat, because the monitor can be moved upward and forward so the display screen is closer to the user and he or she can still adequately type. Unfortunately, this prior art example does not employ telescopic shafts, and instead incorporates swing arms on the exterior of the laptop that add width to the dimension of the computer, take up space, and impede access to the keyboard.

Accordingly, a need remains for an ergonomic laptop in order to overcome the above-noted shortcomings. The present invention satisfies such a need by providing an apparatus that is convenient and easy to use, is durable yet lightweight in design, is versatile in its applications, and effectively permits a user to adjust a viewing angle and height as needed.

BRIEF SUMMARY OF THE INVENTION

In view of the foregoing background, it is therefore an object of the present invention to provide an apparatus for permitting a user to adjust a viewing angle as needed. These and other objects, features, and advantages of the invention are provided by an ergonomic laptop.

An ergonomic laptop for permitting a user to adjust a viewing angle and height as needed may include a base member preferably having a keyboard displayed on a top surface thereof. Additionally, the laptop may include a display screen spaced from the base member and communicatively coupled to the keyboard. A mechanism for linearly biasing the display screen along a y-axis defined above the base member, for adjusting a spatial distance between the display screen and the base member, may also be included. Further, the laptop may include a mechanism for pivoting the display screen about a fulcrum axis oriented along an x-axis defined subjacent to the y-axis. The base member preferably remains statically positioned at a fixed location while the display screen may be linearly displaced along the y-axis.

The pivoting mechanism may further include a plurality of hinges attached to a posterior edge of the base member respectively. In addition, the pivoting mechanism may include a plurality of telescopic shafts preferably having axial top ends statically connected directly to the display screen. Such telescopic shafts further may have bottom ends adjustably seated inside of the hinges respectively. Additionally, the fulcrum axis may be defined parallel to the posterior edge of the base member and spaced subjacent to the display screen respectively. Also, the telescopic shafts and the display screen may move in sync about the fulcrum axis during pivoting procedures such that a bottom edge of the display screen may lie anterior to the posterior edge of the base member after the display screen is folded to a closed position.

The linearly biasing mechanism may include a plurality of rectilinear sleeves directly and statically coupled to an exterior of the telescopic shafts respectively. Each of such sleeves may be provided with a hollow linear cavity preferably having a threaded interior surface respectively. The sleeves may additionally be oriented perpendicular to the shafts and extended inwardly towards each other. The linearly biasing mechanism may also include a single and unitary worm gear centrally disposed between the sleeves. Such a worm gear preferably has axially opposed ends threadably engaged with the sleeves respectively and maintaining continuous engagement therewith. In this manner, a respective longitudinal length of the worm gear and the sleeves may be registered parallel to the x-axis. The worm gear may be rotated within the sleeves and operate to push the sleeves away from each other as the threads of the worm gear travel outwardly from the interior of the sleeves.

The worm gear may include a tab centrally aligned between the opposed ends of the worm gear to be actuated by the user. The tab advantageously allows the user to more easily turn the worm gear and operate the linearly biasing mechanism. Also, first and second rectilinear sections may be included and may have mutually exclusive threaded outer surfaces oriented in first and second paths respectively. The first and second paths may be oriented in opposite directions such that the sleeves may be linearly reciprocated towards and away from the tab as the worm gear is rotated in clockwise and counter clockwise directions about an axis oriented parallel to the x-axis respectively.

Additionally, the shafts may be linearly reciprocated in sync with the sleeves such that the shafts may travel towards and away from the tab while maintaining continuous contact with the display screen respectively. This operation allows the user to move the shafts toward and away from each other along the base and bottom edge of the display screen. This is necessary in order to reinforce and support the display screen as it moves away from the base.

Each of the shafts may further include a rectilinear male member preferably having a hollow cavity provided with a threaded inner surface. The male member may be statically coupled to the display screen as the display screen is raised and lowered along the y-axis. In addition, a rectilinear female member may be included, preferably having a hollow cavity receiving the male member therein such that the male member may be linearly reciprocated within the female member during raising and lowering procedures of the display screen. The female member may remain statically coupled to the base as the male member is reciprocated in and out to adjust the height of the screen.

Additionally, a pole may be threadably mated directly to the male member and seated inside the female member. Such a pole may be rotated along clockwise and counter clockwise directions defined about an axis registered parallel to the y-axis as the tab is rotated in clockwise and counter clockwise directions defined about the axis oriented parallel to the x-axis. This may operate such that the pole may cause the male member to linearly reciprocate along the y-axis. Further, the male member may ingress and egress the female member as the tab and pole are rotated in the respective clockwise and counter clockwise directions.

In this manner, a spatial distance along the y-axis defined between the display screen and the base member may be reduced and enlarged as desired by the user. Therefore, a user may easily adjust the height of the display screen in relation to the base by turning the tab in either direction. As the tab rotates and pushes the shafts away from the center of the base, the pole may turn inside the female member, pushing the male member outward and moving the screen vertically away from the base.

The ergonomic laptop may further include the linearly biasing mechanism preferably having a plurality of rack and pinion sections threadably mated with the poles respectively. Each of the racks may be aligned parallel to the x-axis and each of the pinions may be statically linked to a bottom ends of the poles respectively. In this manner, the pinions may be displaced along the racks as the poles are rotated respectively. The movement of the pinions along the racks is caused by the shafts being driven along the base by the turning of the tab by the user. The racks may be housed within an upper section of the hinges and linearly reciprocated parallel to the x-axis during raising and lowering procedures. Further, the pinions may be reciprocated along mutually exclusive rectilinear paths defined within the upper sections of the hinges respectively.

The display screen of the ergonomic computer may include a plurality of mutually exclusive tracks contiguously formed along the bottom edge thereof and thereby extending parallel to the x-axis. The shafts may be linearly reciprocated along the tracks during raising and lowering procedures. The tracks are preferably the same length as the racks and aligned parallel thereto. In this manner, as the top of the shaft is reciprocated in either direction and reaches an end of the respective track, the pinion within the shaft may reach the end of the respective rack within the hinge on the base.

The present invention may further include a method for adjusting a viewing angle of a laptop. Such a method may include the chronological steps of first providing a base member preferably having a keyboard displayed on a top surface thereof. Next, the method may include providing and communicatively coupling a display screen to the base member while maintaining the display screen spaced from the keyboard. A third step may include adjusting a spatial distance between the display screen and the base member by linearly biasing the display screen along a y-axis defined above the base member.

Fourthly, the method may include pivoting the display screen about a fulcrum axis oriented along an x-axis defined subjacent to the y-axis. Finally, a fifth step may include maintaining the base member statically positioned at a fixed location while the display screen is linearly displaced along the y-axis. This method may allow the user to not only adjust the angle at which the screen is located in relation to where the user is positioned, but also the height of the screen, thereby eliminating any need to bend or lean in an uncomfortable manner to view the screen.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
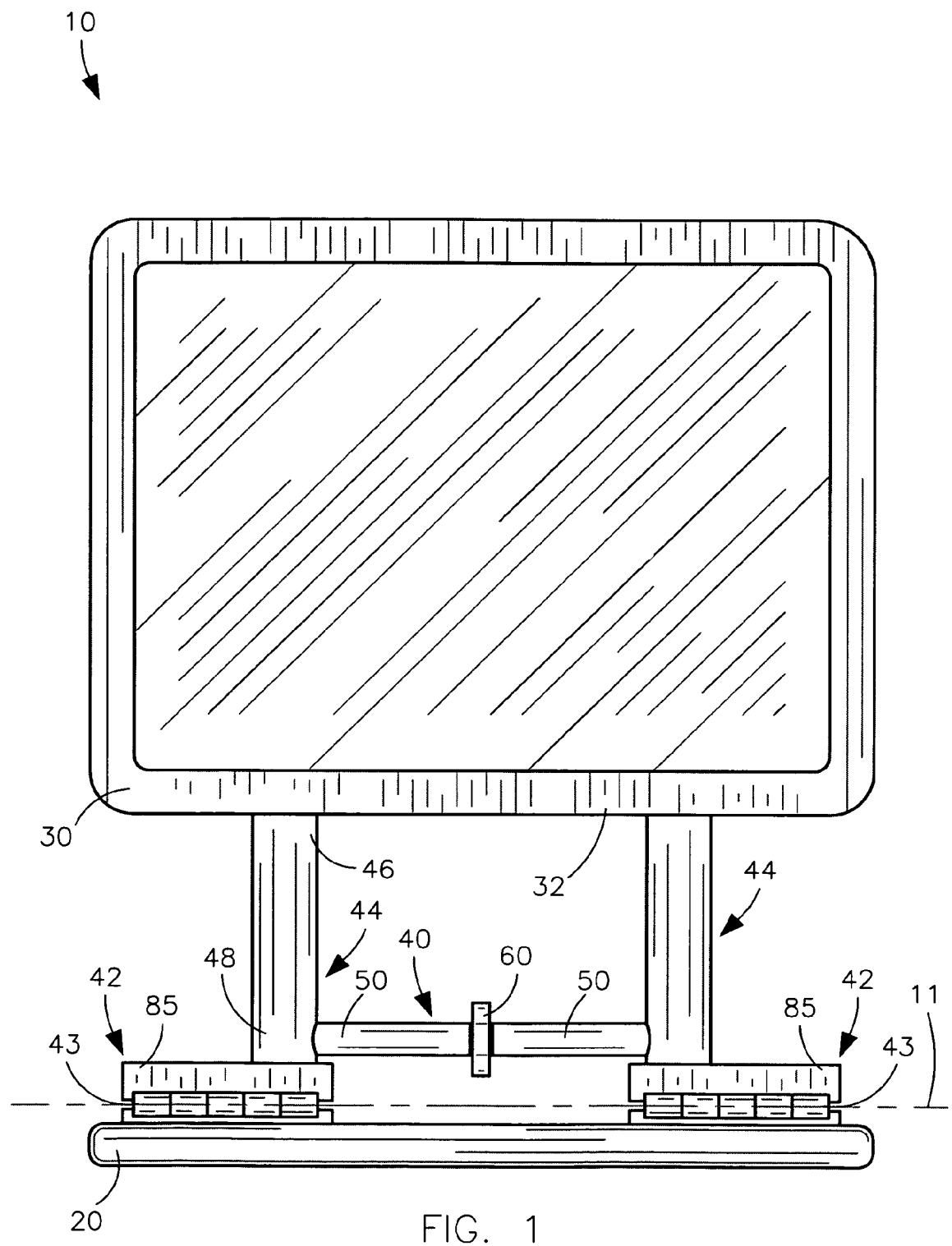
FIG. 1 is a front elevational view showing an ergonomic laptop with an adjustable display at a lowered position, in accordance with the present invention.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The apparatus of this invention is referred to generally in FIGS. 1-6 by the reference numeral 10 and is intended to provide an ergonomic laptop. It should be understood that the apparatus 10 may be used to permit a user to adjust a viewing angle as needed of many different types of computers and should not be limited in use to the applications mentioned herein.

Referring initially to FIGS. 1-7b, an ergonomic laptop 10 for permitting a user to adjust a viewing angle as needed may include a base member 20 preferably having a keyboard 22 displayed on a top surface 24 thereof. Additionally, the laptop 10 may include a display screen 30 spaced from the base member 20 and communicatively coupled to the keyboard 22. A mechanism 40 for linearly biasing the display screen 30 along a y-axis defined above the base member 20, for adjusting a spatial distance between the display screen 30 and the base member 20, may also be included. Further, the laptop 10 may include a mechanism 42 for pivoting the display screen 30 about a fulcrum axis 11 oriented along an x-axis defined subjacent to the y-axis. The base member 20 preferably remains statically positioned at a fixed location while the display screen 30 may be linearly displaced along the y-axis.

Referring again to FIGS. 1-7b, the pivoting mechanism 42 may further include a plurality of hinges 43 attached to a posterior edge 22 of the base member 20 respectively. In addition, the pivoting mechanism 42 may include a plurality of telescopic shafts 44 preferably having axial top ends 46 statically connected directly to the display screen 30. Such telescopic shafts 46 further may have bottom ends 48 adjustably seated inside of the hinges 43 respectively. Additionally, the fulcrum axis 11 may be defined parallel to the posterior edge 22 of the base member 20 and spaced subjacent to the display screen 30 respectively. Also, the telescopic shafts 44 and the display screen 30 may move in sync about the fulcrum axis 11 during pivoting procedures such that a bottom edge 32 of the display screen 30 may lie anterior to the posterior edge 22 of the base member 20 after the display screen 30 is folded to a closed position.

Referring now to FIGS. 1, 2, 4, 7a, and 7b, the linearly biasing mechanism 40 may include a plurality of rectilinear sleeves 50 directly and statically coupled to an exterior of the telescopic shafts 44 respectively. Each of such sleeves 50 may be provided with a hollow linear cavity 52 preferably having a threaded interior surface 53 respectively. The sleeves 50 may additionally be oriented perpendicular to the shafts 44 and extended inwardly towards each other.

Figure 2:
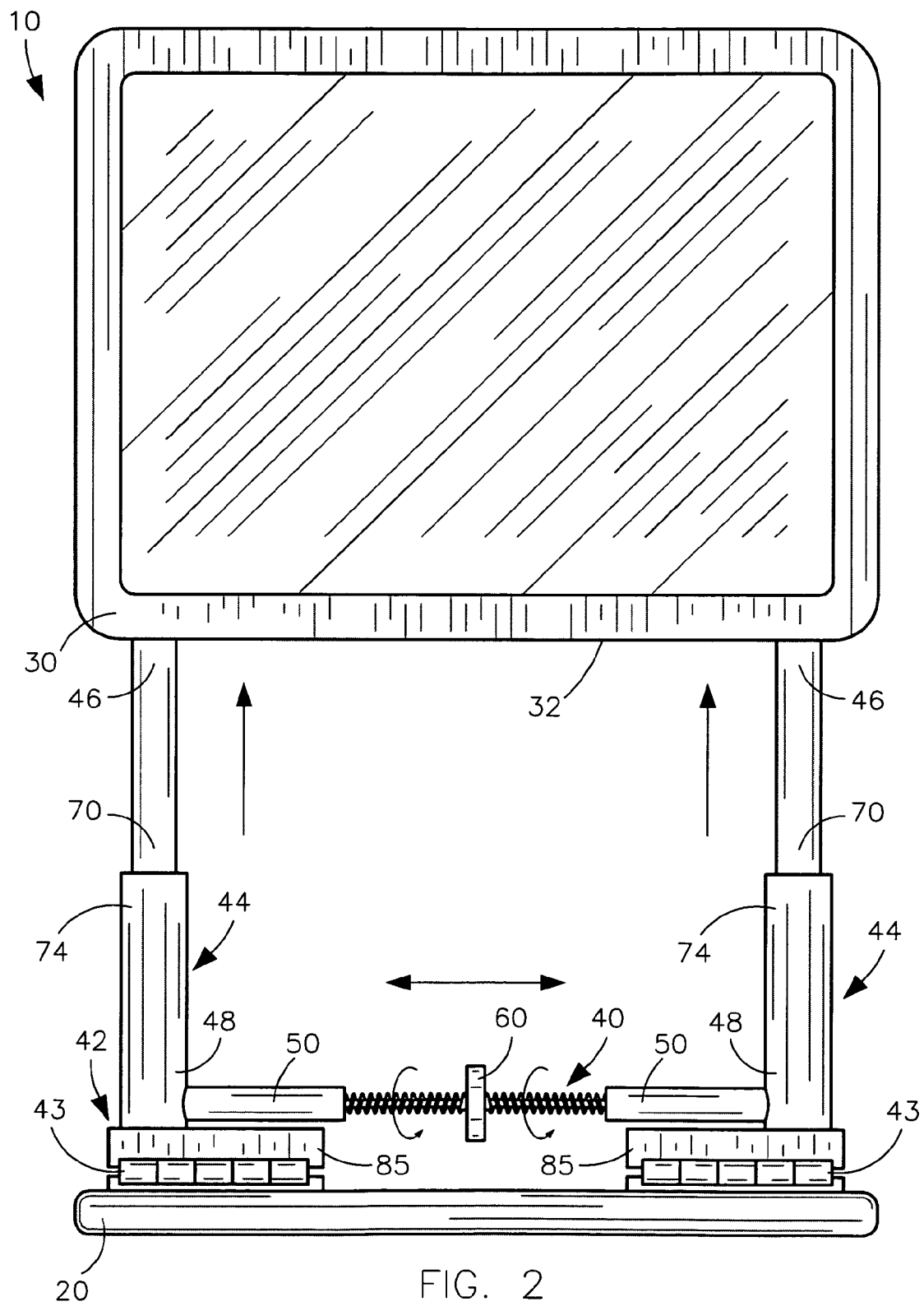
FIG. 2 is a front elevational view showing the display screen at a raised position.
Figure 3:
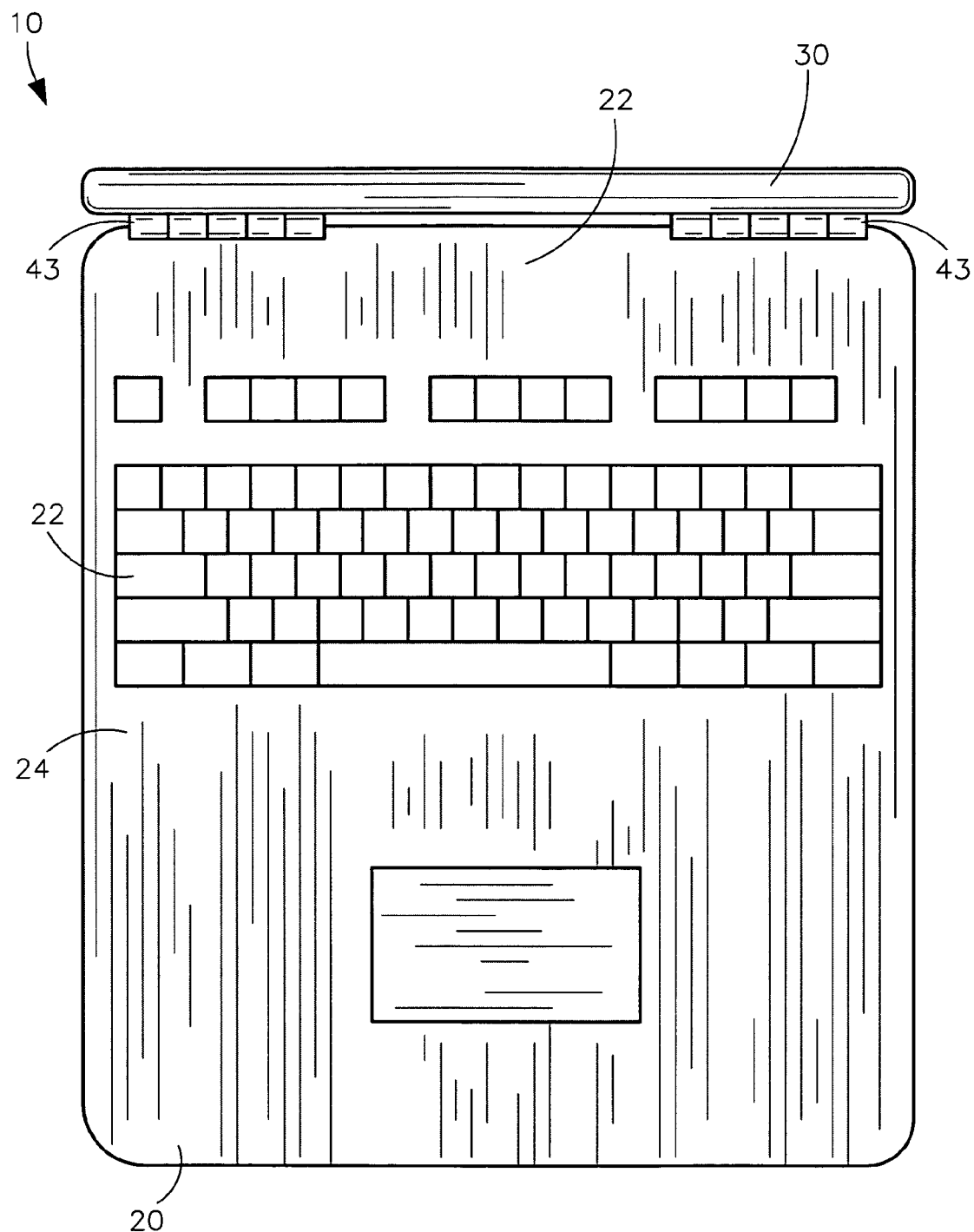
FIG. 3 is a top plan view of the ergonomic laptop in the open position.
Figure 4:
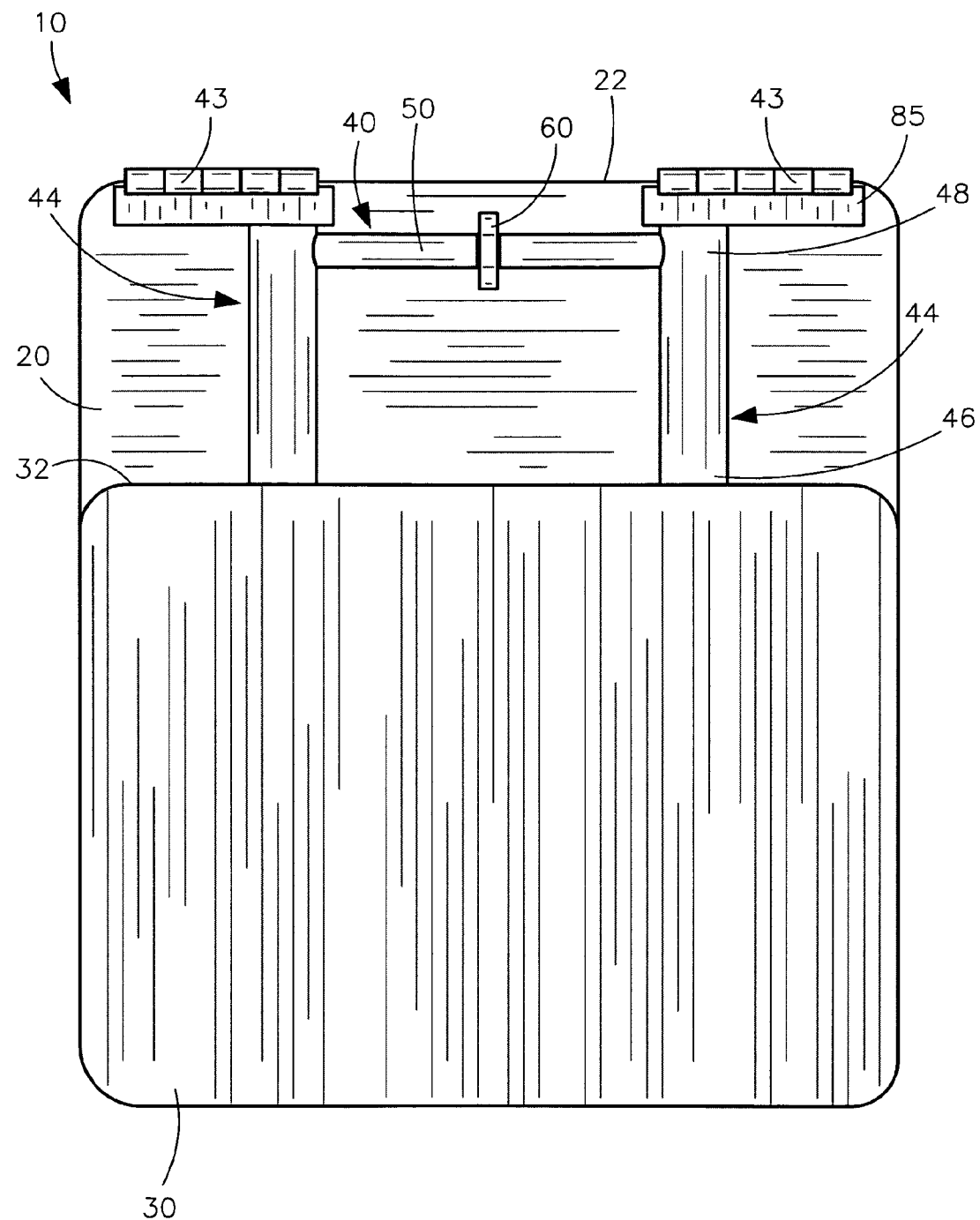
FIG. 4 is a top plan view of the ergonomic laptop in the closed position.
Figure 5:
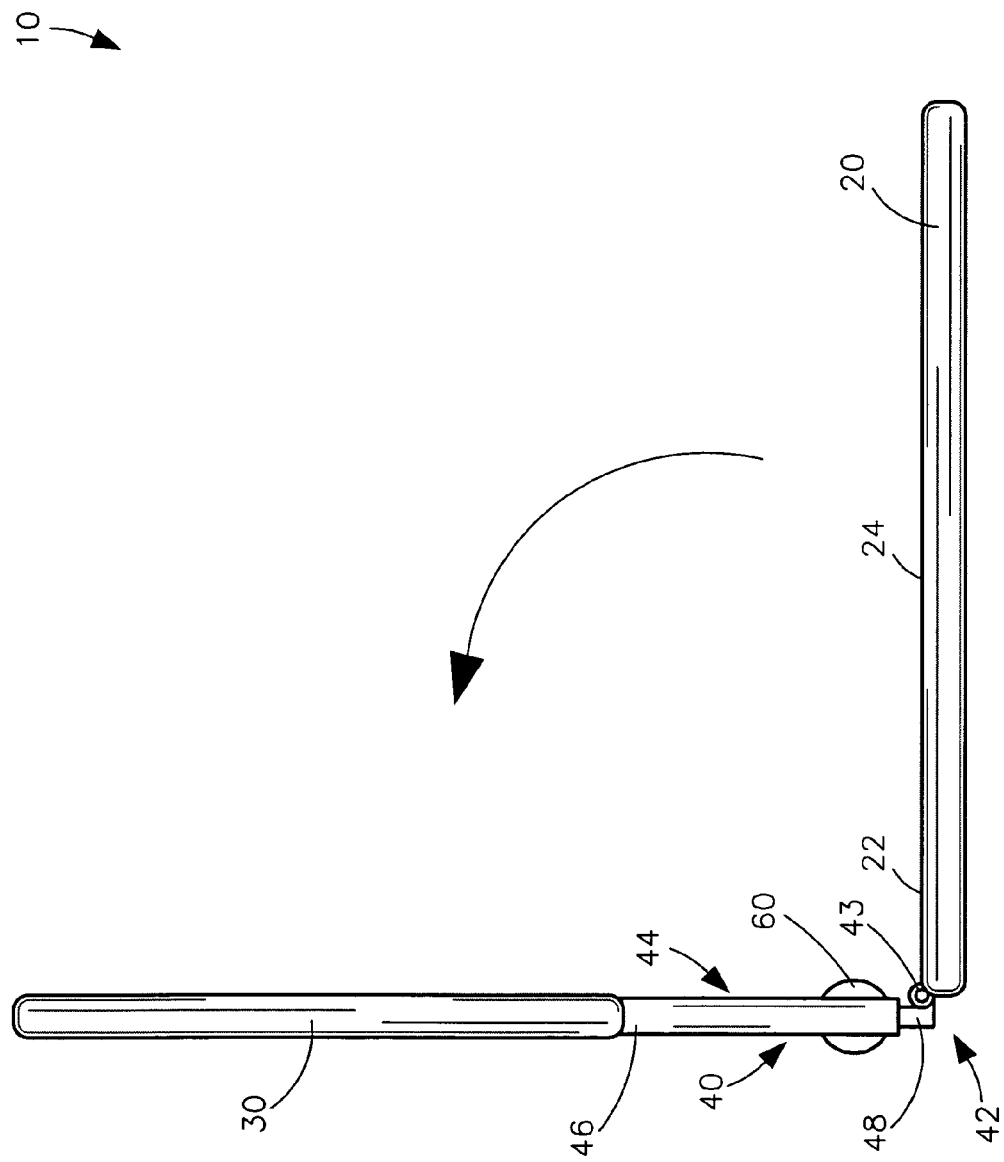
FIG. 5 is a side elevational view of FIG. 3.
Figure 6:
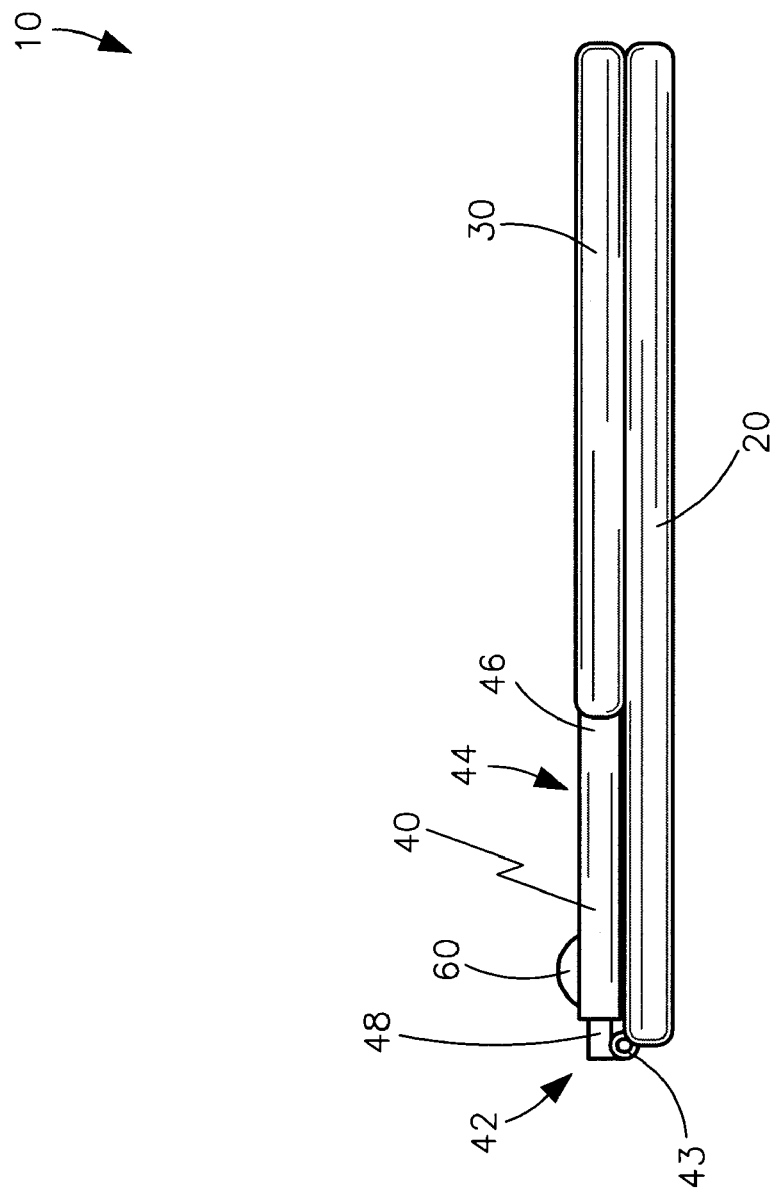
FIG. 6 is a side elevational view of FIG. 4.
Figure 7A:
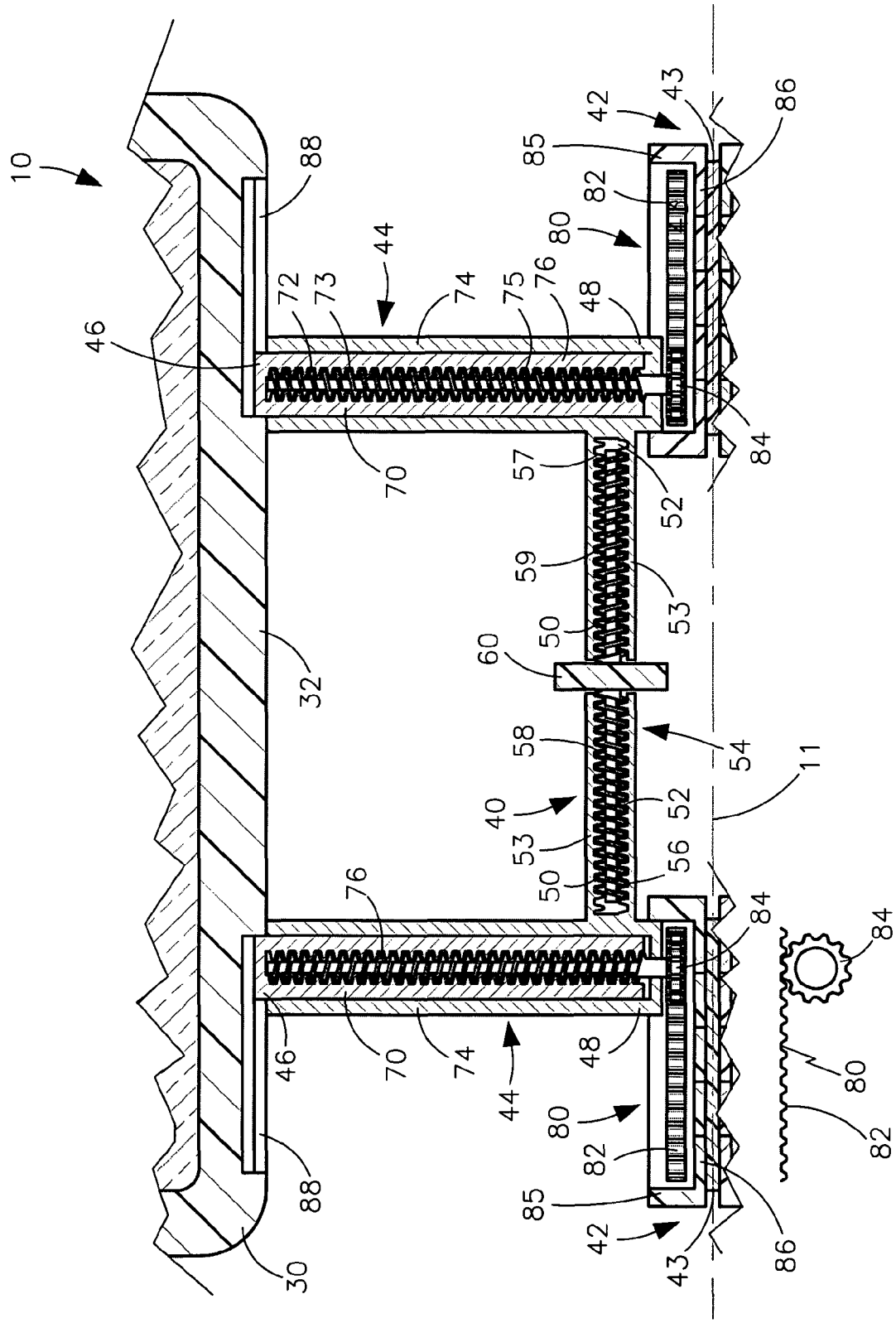
FIG. 7a is a cross-sectional view showing the interrelationship between the worm gears and telescopic shafts in a lowered position.
Figure 7B:
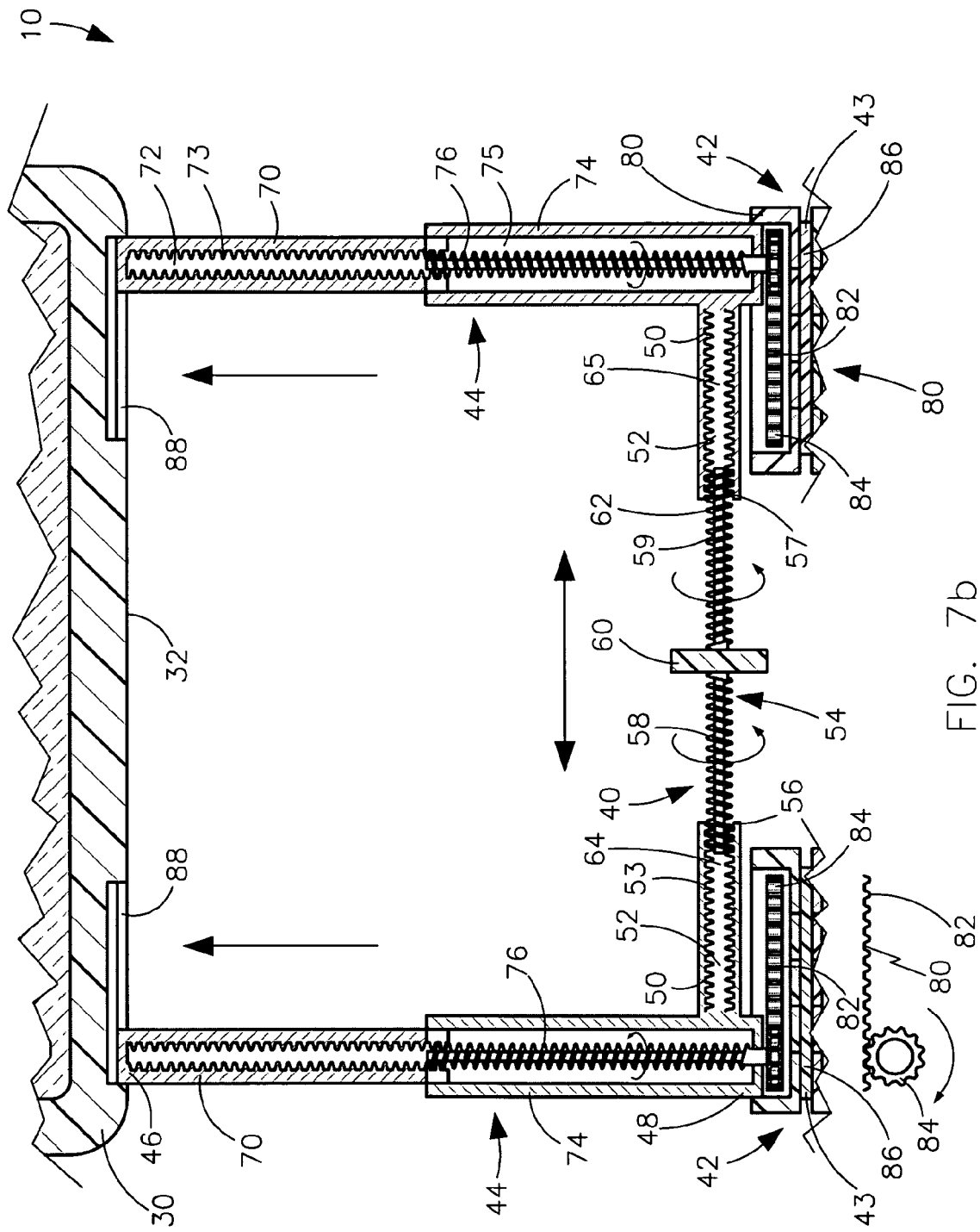
FIG. 7b is a cross-sectional view showing the interrelationship between the worm gears and telescopic shafts in a raised position.

Now referring to FIGS. 2, 7a, and 7b, the linearly biasing mechanism 40 may also include a single and unitary worm gear 54 centrally disposed between the sleeves 50. Such a worm gear 54 preferably has axially opposed ends 56, 57 threadably engaged with each of the sleeves 50 respectively and maintaining continuous engagement therewith. In this manner, a respective longitudinal length of the worm gear 54 and the sleeves 50 may be registered parallel to the x-axis. The worm gear 54 may be rotated within the hollow linear cavities 52 and may operate to push the sleeves 50 away from each other as the worm gear 54 travels outwardly from the sleeves 50.

Referring again to FIGS. 2, 7a, and 7b, the worm gear 54 may include a tab 60 centrally aligned between the opposed ends of the worm gear 54 to be actuated by the user. The tab 60 advantageously allows the user to more easily turn the worm gear 54 and operate the linearly biasing mechanism 40. Also, first and second rectilinear sections 58, 59 may be included and may have mutually exclusive threaded outer surfaces 62 oriented in first and second paths 64, 65 respectively. The first and second paths 64, 65 may be oriented in opposite directions such that the sleeves 50 may be linearly reciprocated towards and away from the tab 60 as the worm gear 54 is rotated in clockwise and counter clockwise directions about an axis oriented parallel to the x-axis respectively.

Additionally, the shafts 44 may be linearly reciprocated in sync with the sleeves 50 such that the shafts 44 may travel towards and away from the tab 60 while maintaining continuous contact with the display screen 30 respectively. This operation allows the user to move the shafts 44 toward and away from each other along the base 20 and bottom edge 32 of the display screen 30. This may provide the unexpected and unpredictable benefit of reinforcing and supporting the display screen 30 as it moves away from the base 20.

Referring now to FIGS. 7a and 7b, each of the shafts 44 may further include a rectilinear male member 70 preferably having a hollow cavity 72 provided with a threaded inner surface 73. Each male member 70 may be statically coupled to the display screen 30 as the display screen 30 is raised and lowered along the y-axis. In addition, a rectilinear female member 74 may be included, preferably having a hollow cavity 75 receiving the male member 70 therein such that the male member 70 may be linearly reciprocated within the female member 74 during raising and lowering procedures of the display screen 30. The female member 74 may remain statically coupled to the base 20 as the male member 70 is reciprocated in and out to adjust the height of the screen 30.

Referring again to FIGS. 7a and 7b, a pole 76 may be threadably mated directly to the male member 70 and seated inside the female member 74. Such a pole 76 may be rotated along clockwise and counter clockwise directions defined about an axis registered parallel to the y-axis as the tab 60 is rotated in clockwise and counter clockwise directions defined about the axis oriented parallel to the x-axis. This may operate such that the pole 76 may cause the male member 70 to linearly reciprocate along the y-axis. Further, the male member 70 may ingress and egress the female member 74 as the tab 60 and pole 76 are rotated in the respective clockwise and counter clockwise directions. In this manner, a spatial distance along the y-axis defined between the display screen 30 and the base member 20 may be reduced and enlarged as desired by the user.

Therefore, a user may easily adjust the height of the display screen 30 in relation to the base 20 by turning the tab 60 in either direction. As the tab 60 rotates and pushes the shafts 44 away from the center of the base 20, the poles 76 may turn inside the female members 74, pushing the male members 70 outward and moving the screen 30 vertically away from the base 20. The combination of such claimed elements provides an unpredictable and unexpected result which is not rendered obvious by one skilled in the art.

Once again referring to FIGS. 7a and 7b, the ergonomic laptop 10 may include the linearly biasing mechanism 40 preferably having a plurality of rack and pinion sections 80 threadably mated with the poles 76 respectively. Each of the racks 82 may be aligned parallel to the x-axis and each of the pinions 84 may be statically linked to a bottom ends of the poles 76 respectively. In this manner, the pinions 84 may be displaced along the racks 82 as the poles 76 are rotated respectively. The movement of the pinions 84 along the racks 82 may be caused by the shafts 44 being driven along the base 20 by the turning of the tab 60 by the user. The racks 82 may be housed within an upper section 85 of the hinges 43 and linearly reciprocated parallel to the x-axis during raising and lowering procedures. Further, the pinions 84 may be reciprocated along mutually exclusive rectilinear paths 86 defined within the upper sections 85 of the hinges 43 respectively.

Referring to FIGS. 7a and 7b again, the display screen 30 of the ergonomic computer 10 may further include a plurality of mutually exclusive tracks 86 contiguously formed along the bottom edge 32 thereof and thereby extending parallel to the x-axis. The top ends 46 of the shafts 44 may be linearly reciprocated along the tracks 86 during raising and lowering procedures.

Additionally, the tracks 86 are preferably the same length as the racks 82 and aligned parallel thereto. In this manner, as the top ends 46 are reciprocated in either direction to reach an end of the respective track 86, the pinion 84 within the shaft 44 may reach the end of the respective rack 82 within the upper sections 85 of the hinges 43. This in turn allows for the unexpected and unpredictable benefit of a smooth operation of the linearly biasing mechanism 40 by allowing the user to adjust the height of the screen 30 with little effort.

Referring now to FIGS. 1-7b, the present invention may further include a method for adjusting a viewing angle of a laptop 10. Such a method may include the chronological steps of first providing a base member 20 preferably having a keyboard 22 displayed on a top surface 24 thereof. Next, the method may include providing and communicatively coupling a display screen 30 to the base member 20 while maintaining the display screen 30 spaced from the keyboard 22. A third step may include adjusting a spatial distance between the display screen 30 and the base member 20 by linearly biasing the display screen 30 along a y-axis defined above the base member 20.

Fourthly, the method may include pivoting the display screen 30 about a fulcrum axis 11 oriented along an x-axis defined subjacent to the y-axis. Finally, a fifth step may include maintaining the base member 20 statically positioned at a fixed location while the display screen 30 is linearly displaced along the y-axis. This method may allow the user to not only adjust the angle at which the screen 30 is located in relation to where the user is positioned, but also the height of the screen 30, thereby advantageously eliminating any need to bend or lean in an uncomfortable manner to view the screen 30.

It should be further understood that the present invention as described refers to a preferred embodiment and should not be limited by the descriptions provided herein. In an alternate embodiment, the apparatus may include the linearly biasing mechanism employing hydraulic telescoping shafts and sleeves without the use of worm gears. In this manner, the user may simply pull the screen upward to the desired height to be held in place by the shaft's internal pressure. Also, the shafts may simply employ pin locks to snap in place at a variety of height levels. In addition, for aesthetic purposes, the vertically adjusting shafts may be housed together and concealed within a central column.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. An ergonomic laptop for permitting a user to adjust a viewing angle as needed, said ergonomic laptop comprising:
   a base member having a keyboard displayed on a top surface thereof;
   a display screen spaced from said base member and communicatively coupled to said keyboard;
   means for linearly biasing said display screen along a y-axis defined above said base member for adjusting a spatial distance between said display screen and said base member; and
   means for pivoting said display screen about a fulcrum axis oriented along an x-axis defined subjacent to the y-axis;
   wherein said pivoting means comprises:

a plurality of hinges attached to a posterior edge of said base member respectively; and a plurality of telescopic shafts having axially top ends statically connected directly to said display screen, said telescopic shafts further having bottom ends adjustably seated inside of said hinges respectively;

wherein said fulcrum axis is defined parallel to said posterior edge of said base member and spaced subjacent to said display screen respectively;

wherein said telescopic shafts and said display screen move in sync about said fulcrum axis during pivoting procedures such that a bottom edge of said display screen lays anterior to said posterior edge of said base member after said display screen is folded to a closed position;

wherein said linearly biasing means comprises:

a plurality of rectilinear sleeves directly and statically coupled to an exterior of said telescopic shafts respectively, each of said sleeves being provided with a hollow linear cavity having a threaded interior surface respectively, said sleeves being oriented perpendicular to said shafts and extending inwardly towards each other; and a single and unitary worm gear centrally disposed between said sleeves, said worm gear having axially opposed ends threadably engaged with said sleeves respectively and maintaining continuous engagement therewith;

wherein a respective longitudinal length of said worm gear and said sleeves is registered parallel to the x-axis.

2. The ergonomic laptop of claim 1, wherein said worm gear comprises:

a tab centrally aligned between said opposed ends of said worm gear for being actuated by the user; and first and second rectilinear sections having mutually exclusive threaded outer surfaces oriented in first and second paths respectively;

wherein said first and second paths are oriented in opposite directions such that said sleeves are linearly reciprocated towards and away from said tab as said worm gear is rotated in clockwise and counter clockwise directions about an axis oriented parallel to the x-axis respectively;

wherein said shafts are linearly reciprocated in sync with said sleeves such that said shafts travel towards and away from said tab while maintaining continuous contact with said display screen respectively.

3. The ergonomic laptop of claim 2, wherein each of said shafts comprises:

a rectilinear male member having a hollow cavity provided with a threaded inner surface, said male member being statically coupled to said display screen as said display screen is raised and lowered along the y-axis;

a rectilinear female member having a hollow cavity receiving said male member therein such that said male member is linearly reciprocated within said female member during raising and lowering procedures of said display screen; and a pole threadably mated directly to said male member and seated inside said female member, said pole being rotated along clockwise and counter clockwise directions defined about an axis registered parallel to the y-axis as said tab is rotated in clockwise and counter clockwise directions defined about the axis oriented parallel to the x-axis such that said pole causes said male member to linear reciprocate along the y-axis;

wherein said male member ingresses and egresses said female member as said tab and said pole are rotated in said respective clockwise and counter clockwise directions to thereby reduce and enlarge a spatial distance along the y-axis defined between said display screen and said base member.

4. The ergonomic laptop of claim 3, wherein said linearly biasing means further comprises:

a plurality of rack and pinion sections threadably mated with said poles respectively;

each of said racks being aligned parallel to the x-axis and each of said pinions being statically linked to a bottom end of said poles respectively such that said pinions are displaced along said racks as said poles are rotated respectively;

wherein said racks are housed within an upper section of said hinges and linearly reciprocate parallel to the x-axis during raising and lowering procedures.

5. The ergonomic laptop of claim 4, wherein said pinions are reciprocated along mutually exclusive rectilinear paths defined within said upper sections of said hinges respectively.

6. The ergonomic laptop of claim 4, wherein said display screen comprises: a plurality of mutually exclusive tracks contiguously formed along said bottom edge thereof and thereby extending parallel to the x-axis, said shafts being linearly reciprocated along said tracks during raising and lowering procedures.

7. An ergonomic laptop for permitting a user to adjust a viewing angle as needed, said ergonomic laptop comprising:

a base member having a keyboard displayed on a top surface thereof;

a display screen spaced from said base member and communicatively coupled to said keyboard;

means for linearly biasing said display screen along a y-axis defined above said base member for adjusting a spatial distance between said display screen and said base member; and means for pivoting said display screen about a fulcrum axis oriented along an x-axis defined subjacent to the y-axis;

wherein said base member remains statically positioned at a fixed location while said display screen is linearly displaced along the y-axis;

wherein said pivoting means comprises:

a plurality of hinges attached to a posterior edge of said base member respectively; and a plurality of telescopic shafts having axially top ends statically connected directly to said display screen, said telescopic shafts further having bottom ends adjustably seated inside of said hinges respectively;

wherein said fulcrum axis is defined parallel to said posterior edge of said base member and spaced subjacent to said display screen respectively;

wherein said telescopic shafts and said display screen move in sync about said fulcrum axis during pivoting procedures such that a bottom edge of said display screen lays anterior to said posterior edge of said base member after said display screen is folded to a closed position;

wherein said linearly biasing means comprises:

a plurality of rectilinear sleeves directly and statically coupled to an exterior of said telescopic shafts respectively, each of said sleeves being provided with a hollow linear cavity having a threaded interior surface respectively, said sleeves being oriented perpendicular to said shafts and extending inwardly towards each other; and a single and unitary worm gear centrally disposed between said sleeves, said worm gear having axially opposed ends threadably engaged with said sleeves respectively and maintaining continuous engagement therewith;

wherein a respective longitudinal length of said worm gear and said sleeves is registered parallel to the x-axis.

8. The ergonomic laptop of claim 7, wherein said worm gear comprises:
- a tab centrally aligned between said opposed ends of said worm gear for being actuated by the user; and
- first and second rectilinear sections having mutually exclusive threaded outer surfaces oriented in first and second paths respectively;
- wherein said first and second paths are oriented in opposite directions such that said sleeves are linearly reciprocated towards and away from said tab as said worm gear is rotated in clockwise and counter clockwise directions about an axis oriented parallel to the x-axis respectively;
- wherein said shafts are linearly reciprocated in sync with said sleeves such that said shafts travel towards and away from said tab while maintaining continuous contact with said display screen respectively.

9. The ergonomic laptop of claim 8, wherein each of said shafts comprises:
- a rectilinear male member having a hollow cavity provided with a threaded inner surface, said male member being statically coupled to said display screen as said display screen is raised and lowered along the y-axis;
- a rectilinear female member having a hollow cavity receiving said male member therein such that said male member is linearly reciprocated within said female member during raising and lowering procedures of said display screen; and
- a pole threadably mated directly to said male member and seated inside said female member, said pole being rotated along clockwise and counter clockwise directions defined about an axis registered parallel to the y-axis as said tab is rotated in clockwise and counter clockwise directions defined about the axis oriented parallel to the x-axis such that said pole causes said male member to linear reciprocate along the y-axis;
- wherein said male member ingresses and egresses said female member as said tab and said pole are rotated in said respective clockwise and counter clockwise directions to thereby reduce and enlarge a spatial distance along the y-axis defined between said display screen and said base member.

10. The ergonomic laptop of claim 9, wherein said linearly biasing means further comprises:
- a plurality of rack and pinion sections threadably mated with said poles respectively;
- each of said racks being aligned parallel to the x-axis and each of said pinions being statically linked to a bottom end of said poles respectively such that said pinions are displaced along said racks as said poles are rotated respectively;
- wherein said racks are housed within an upper section of said hinges and linearly reciprocate parallel to the x-axis during raising and lowering procedures.

11. The ergonomic laptop of claim 10, wherein said pinions are reciprocated along mutually exclusive rectilinear paths defined within said upper sections of said hinges respectively.

12. The ergonomic laptop of claim 10, wherein said display screen comprises: a plurality of mutually exclusive tracks contiguously formed along said bottom edge thereof and thereby extending parallel to the x-axis, said shafts being linearly reciprocated along said tracks during raising and lowering procedures.

* * * * *